US012759347B2

(12) United States Patent
Kim et al.

(10) Patent No.: US 12,759,347 B2

(45) Date of Patent: Oct. 13, 2026

(54) TIRE

(71) Applicant: HANKOOK TIRE & TECHNOLOGY CO., LTD., Seongnam-si (KR)

(72) Inventors: A Reum Kim, Seongnam-si (KR); Myong Joong Lee, Yongin-si (KR); Su Jin Son, Seongnam-si (KR); Hee Sung Jang, Seoul (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 34 days.

(21) Appl. No.: 18/578,951

(22) PCT Filed: Jul. 13, 2022

(86) PCT No.: PCT/KR2022/010185

§ 371 (c)(1),
(2) Date: Jan. 12, 2024

(87) PCT Pub. No.: WO2023/287187

PCT Pub. Date: Jan. 19, 2023

(65) Prior Publication Data

US 2024/0383287 A1 Nov. 21, 2024

(30) Foreign Application Priority Data

Jul. 14, 2021 (KR) ........................ 10-2021-0092236

(51) Int. Cl.
*B60C 13/02* (2006.01)

(52) U.S. Cl.
CPC .................................... *B60C 13/02* (2013.01)

(58) Field of Classification Search
CPC ...... B60C 13/02; B60C 13/002; B60C 13/001
See application file for complete search history.

(56) References Cited

U.S. PATENT DOCUMENTS

2008/0283169 A1* 11/2008 Sato ...................... B60C 13/001 152/450
2011/0036475 A1* 2/2011 Kojima ................... B60C 13/02 152/454

(Continued)

FOREIGN PATENT DOCUMENTS

JP 2015-209048 A 11/2015
JP 2017-065602 A 4/2017

(Continued)

OTHER PUBLICATIONS

"Concave—definition, examples, related words and more at wordnik," Wordnik.com, https://www.wordnik.com/words/concave (accessed Feb. 3, 2026). (Year: 2026).*

*Primary Examiner* — Katelyn W Smith
*Assistant Examiner* — Brendon Charles Darby
(74) *Attorney, Agent, or Firm* — Bridgeway IP Law Group, PLLC; Jihun Kim

(57) ABSTRACT

An embodiment provides a tire comprising a sidewall portion extending from the end of a tread portion and having a plurality of concave portions which are formed inwardly from the outer surface of the sidewall portion, the depth increasing going from the periphery to the center or being constant from the periphery to the center, and which are arranged in the circumferential direction of the tire.

16 Claims, 7 Drawing Sheets

(56) References Cited

U.S. PATENT DOCUMENTS

| | | | | |
|---|---|---|---|---|
| 2014/0144565 | A1 * | 5/2014 | Yukawa | B60C 15/0045 152/523 |
| 2015/0352907 | A1 * | 12/2015 | Kaneko | B60C 13/02 152/523 |
| 2020/0324580 | A1 * | 10/2020 | Takemori | B60C 13/00 |

FOREIGN PATENT DOCUMENTS

| | | | |
|---|---|---|---|
| JP | 2021-024436 | A | 2/2021 |
| KR | 10-2010-0134752 | A | 12/2010 |
| KR | 10-2013-0085448 | A | 7/2013 |

* cited by examiner

TIRE

TECHNICAL FIELD

The present invention relates to a tire, more specifically to a tire having dimples (concave portions) formed on a sidewall.

BACKGROUND ART

To reduce driving noise generated by the air colliding against a tire and drag applied to the tire due to the air colliding against the tire, while a vehicle onto which the tire is mounted is being driven, and to help heat generated by the friction of the tire against a road surface emitted, a plurality of dimples each having the shape of a groove are formed on the outer surface of a sidewall of the tire. In this case, the reduction of the drag applied to the tire, the suppression of the driving noise, and the emission of the heat generated may be varied according to the shapes, structures, and arrangements of the dimples.

DISCLOSURE OF THE INVENTION

Technical Problems

It is an object of the present invention to provide a tire that is capable of reducing drag and aerodynamic force applied thereto, while a vehicle is being driven.

The technical problems to be achieved through the present invention are not limited as mentioned above, and other technical problems not mentioned herein will be obviously understood by one of ordinary skill in the art through the following description.

Technical Solutions

To accomplish the above-mentioned objects, according to one aspect of the present invention, there is provided a tire including sidewalls extending from both sides of tread and having a plurality of concave portions arranged in a circumferential direction of the tire, wherein each concave portion is formed inward from the outer surface of the sidewall in such a way as to have a depth increasing toward the center from the edges thereof or have a depth constant toward the center from the edges thereof.

According to an embodiment of the present invention, the sidewall may include grooves formed among the neighboring concave portions of the plurality of concave portions and each groove may be formed inward from the outer surface of the sidewall in such a way as to have a depth longer than the maximum depth of each concave portion.

According to an embodiment of the present invention, the grooves may extend along the edges of the concave portions to surround the concave portions.

According to an embodiment of the present invention, each groove may become reduced in width from the outer surface of the sidewall toward the inside thereof.

According to an embodiment of the present invention, each groove may extend in a constant width from the outer surface of the sidewall toward the inside thereof.

According to an embodiment of the present invention, the plurality of concave portions may be arranged in a plurality of columns spaced apart from one another in a radial direction of the tire, and the concave portions located on any one of the plurality of columns may be arranged misaligned with the concave portions located on another column of the plurality of columns.

According to an embodiment of the present invention, each concave portion may have a width in the circumferential direction of the tire longer than a width in the radial direction of the tire.

According to an embodiment of the present invention, the sidewall may include a serration part located on at least one of an area between a first formation area where the concave portions are arranged and the tread on the outer surface thereof and an area spaced apart from the first formation area in the circumferential direction of the tire on the outer surface thereof.

According to an embodiment of the present invention, the sidewall may include a display area located on the outer surface thereof in such a way as to be spaced apart from the concave portions.

To accomplish the above-mentioned objects, according to another aspect of the present invention, there is provided a tire including sidewalls extending from both sides of tread and having a plurality of first concave portions arranged in a radial direction of the tire, each first concave portion being formed inward from the outer surface of the sidewall in such a way as to have a depth increasing toward the center from the edges thereof or have a depth constant toward the center from the edges thereof, and a plurality of second concave portions located on the outsides of the first concave portions in the radial direction of the tire, each second concave portion being formed inward from the outer surface of the sidewall.

According to an embodiment of the present invention, the plurality of first concave portions may be arranged in a plurality of rows spaced apart from one another in a circumferential direction of the tire, and the second concave portions may be located on some of the plurality of rows.

According to an embodiment of the present invention, the plurality of first concave portions located on any one row of the plurality of rows may have different sizes from one another.

According to an embodiment of the present invention, the plurality of first concave portions may become gradually reduced in size toward an inner radial direction of the tire from an outer radial direction of the tire.

According to an embodiment of the present invention, each first concave portion and each second concave portion may have widths in the circumferential direction of the tire longer than widths in the radial direction of the tire.

According to an embodiment of the present invention, the width of the second concave portion in the circumferential direction of the tire may become reduced toward the inner radial direction of the tire from the outer radial direction of the tire.

According to an embodiment of the present invention, the sidewall may include a serration part located on at least one of an area between a second formation area where the plurality of first concave portions and the plurality of second concave portions are arranged and the tread on the outer surface thereof and an area spaced apart from the second formation area in the circumferential direction of the tire on the outer surface thereof.

According to an embodiment of the present invention, the sidewall may include a display area located on the outer surface thereof in such a way as to be surrounded with the plurality of first concave portions and the plurality of second concave portions.

Advantageous Effects of the Invention

Therefore, the tire according to the embodiment of the present invention is configured to allow the concave portions each having the shape of the groove whose section is rhombus-shaped to be formed in a given pattern on the outer surface of the sidewall, thereby easily emitting the heat generated while the vehicle is being driven and reducing the drag applied between the tire and the air due to the vehicle being driven. Further, the tire according to another embodiment of the present invention is configured to allow the first concave portions and the second concave portions having different shapes and sizes from one another to be formed on the outer surface of the sidewall to apply given tendency to their arranged pattern, thereby more improving tire heat emission and drag reduction effectiveness while the vehicle is being driven.

BEST MODE FOR INVENTION

Figure 1:
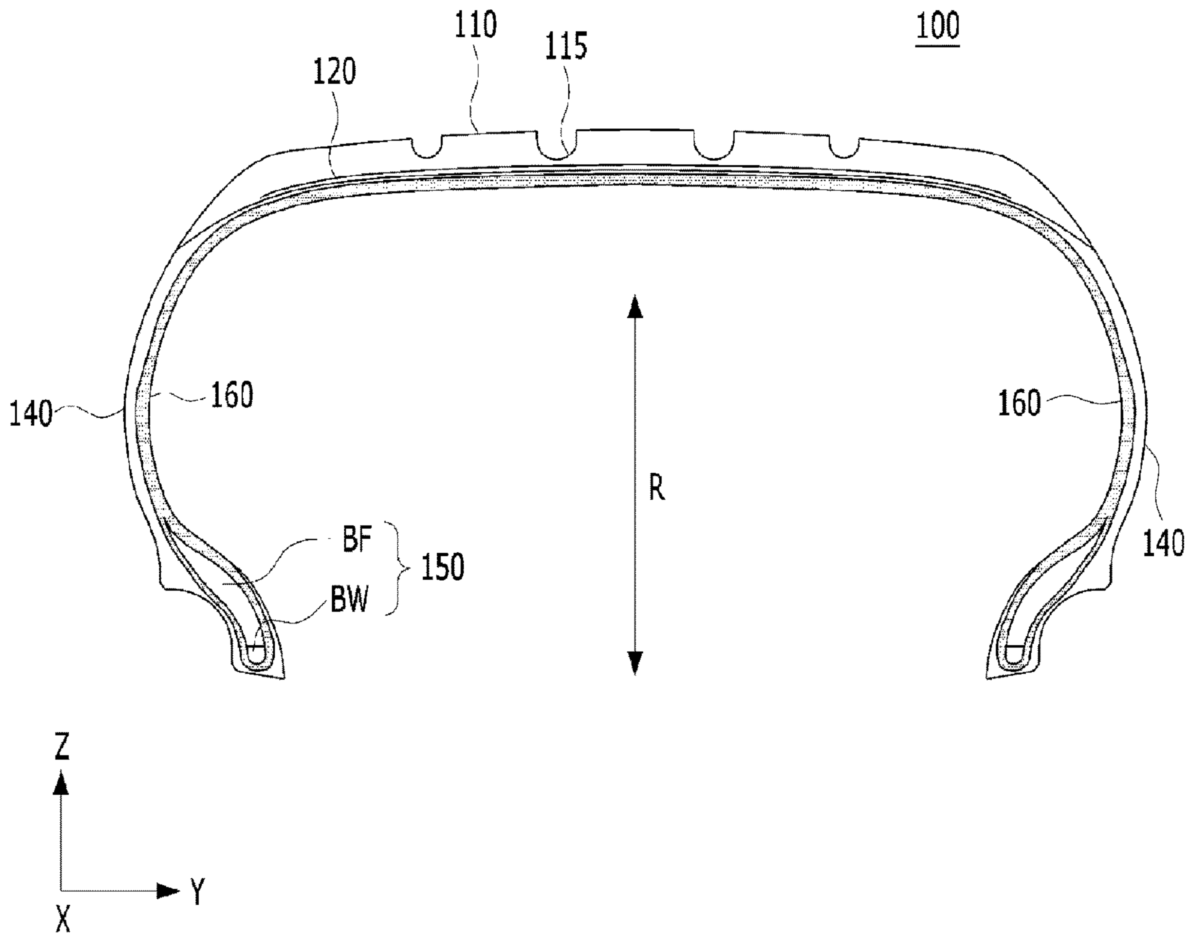
FIG. 1 is a sectional view showing a tire according to an embodiment of the present invention.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

When it is said that one element is described as being “connected (connected, contacted, or coupled)” to the other element, one element may be directly connected or coupled to the other element, but it should be understood that another element may be present between the two elements. In contrast, when it is said that one element is described as being “directly connected” or “directly coupled” to the other element, it should be understood that another element is not present between the two elements.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as “comprise”, “include”, or “have”, are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

FIG. 1 is a sectional view showing a tire according to an embodiment of the present invention.

Referring to FIG. 1, a tire 100 includes tread 110, sidewalls 140 extending from both sides of the tread 110, and beads 150 disposed on ends of the sidewalls 140.

The tire 100 includes a belt layer 120 and a carcass 130 located under the tread 110, and a cap ply is located on top of the belt layer 120. Further, the tire 100 includes an inner liner 160 located inside the tread 110 and the pair of sidewalls 140 to maintain the internal air pressure thereof.

The tread 110 has tread blocks TB defined by a plurality of grooves. The tread blocks TB come into contact into the ground, while a vehicle is being driven, and they are defined by longitudinal grooves 115 formed in a circumferential direction of the tire 100 and transverse grooves formed in a transverse direction of the tire 100. The tread 110 is formed of a thick rubber layer to transmit driving and braking forces of the vehicle to the ground.

The tread blocks TB have tread patterns and blocks defined by the tread patterns formed on the surfaces thereof to ensure control stability, tractive power, and braking performance. The tread patterns include a plurality of grooves adapted to drain water while the vehicle is being driven on a wet road surface and sipes adapted to boost traction and braking. The sipes are formed on the blocks and have smaller sizes than the grooves. The sipes are adapted to suck water while the vehicle is being driven on a wet road surface, so that a water film is cut, thereby allowing the driving and braking forces of the tire 100 to increase.

The tread 110 has shoulders disposed on sides thereof to emit the heat generated from the interior of the tire 100 while the vehicle is being driven.

The tread 110 includes the carcass 130, the belt layer 120, the cap ply, and the inner liner 160 located therein.

The carcass 130 extends along the tread 110, the sidewalls 140, and the beads 150 and is the frame of the tire 100. The carcass 130 is configured to allow tire cords to be bonded into given rubber components.

The carcass 130 are wound on the beads 150 to produce internal spaces surrounded thereby, and bead cores BW and bead fillers BF are located in the internal spaces.

The carcass 130 is made by stacking a plurality of cord fabrics made of high strength organic fiber materials, such as steel, polyester, rayon, and the like, coating the stacked cord fabrics with rubber, and rolling the coated cord fabrics.

In detail, the carcass 130 comprises one or more rubber components selected from the group consisting of synthetic rubber and natural rubber and at least one or more tire cords. Various natural fibers, rayon, nylon, polyester, and Kevlar are used as the tire cords, and otherwise, steel cords made by twisting a plurality of thin steel wires may be used as the tire cords.

The belt layer 120 is located inside the tread 110 and extends in the transvers direction of the tire 100. The belt layer 120 improves the durability of the tire 100 and serves as the frame of the tire 100. Further, the belt layer 120 serves to relieve external impacts and keep the contact area of the tread 110 to a large range, thereby ensuring the driving stability of the vehicle. The belt layer 120 is located under the tread 110 and made by coating a plurality of belt cords (not shown) made of steel or organic fiber materials with rubber and rolling the coated belt cords.

The belt layer 120 includes a plurality of belts. For example, the belt layer 120 includes a first belt 151 located on top of the inner liner 160 forming the inner surface of the tire 100 and a second layer 152 located on top of the first belt 151.

The cap ply is located between the tread 110 and the belt layer 120. The cap ply is a special cord fabric attached to top of the belt layer 120 to improve performance of the tire 100, while the vehicle is being driven. For example, the cap ply is made of polyester as a synthetic fiber. The cap ply is supported against the belt layer 120 and the carcass 130 and serves to minimize the movements of the belt layer 120, while the vehicle is being driven, to ensure the driving stability of the vehicle.

The inner liner 160 is located inside the tire 100 to prevent air leakage and maintain the internal air pressure of the tire 100. The inner liner 160 is formed of a rubber layer having excellent sealing. For example, the inner liner 160 is made of butyl rubber having high density.

The inner liner 160 is located inside the carcass 130 and extends toward the beads 150. The inner liner 160 comes into contact with one surface of the carcass 130, and both ends thereof come into contact with the beads 150.

Figure 2:
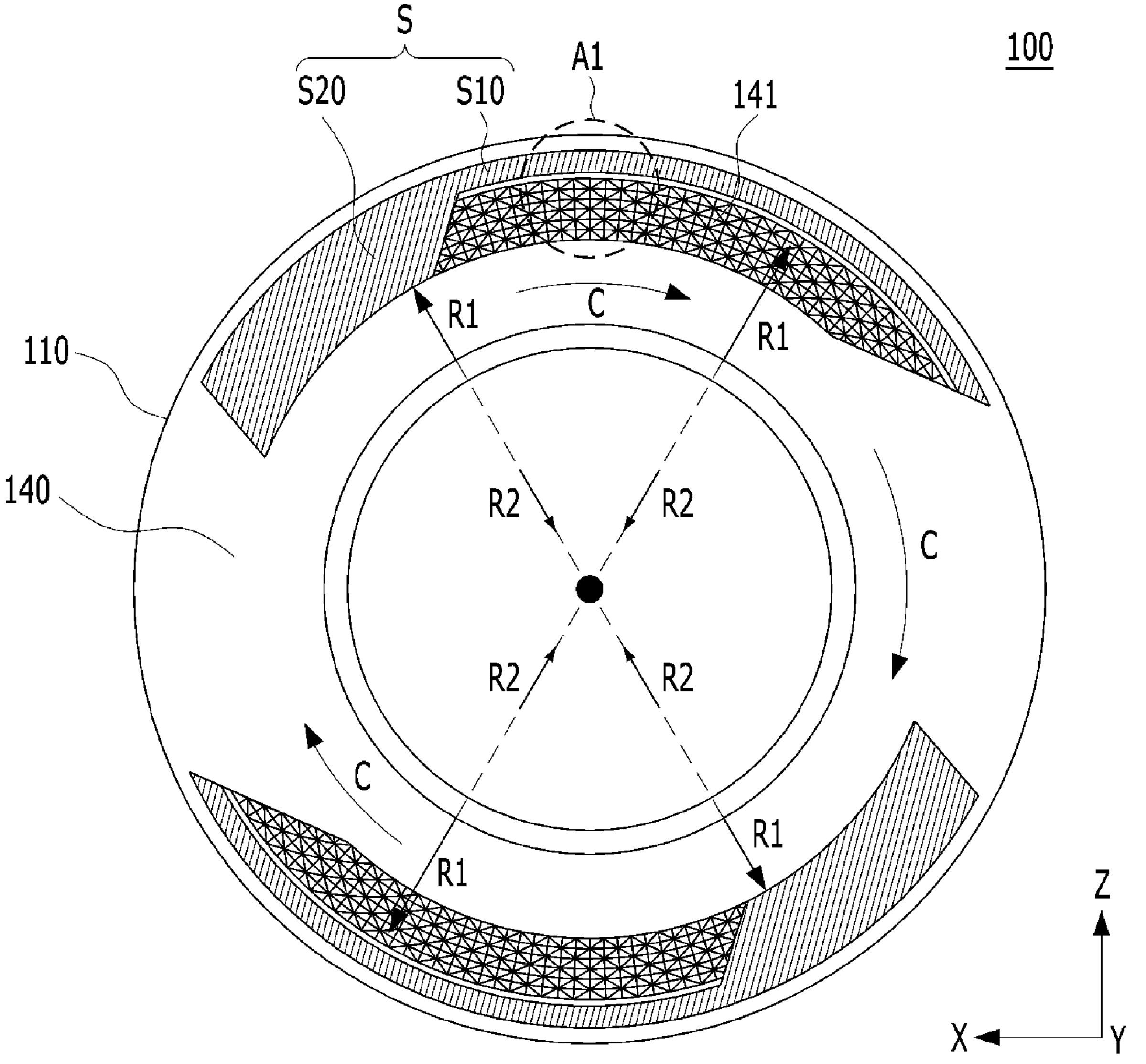
FIG. 2 is a side view showing the tire according to the embodiment of the present invention.
Figure 3:
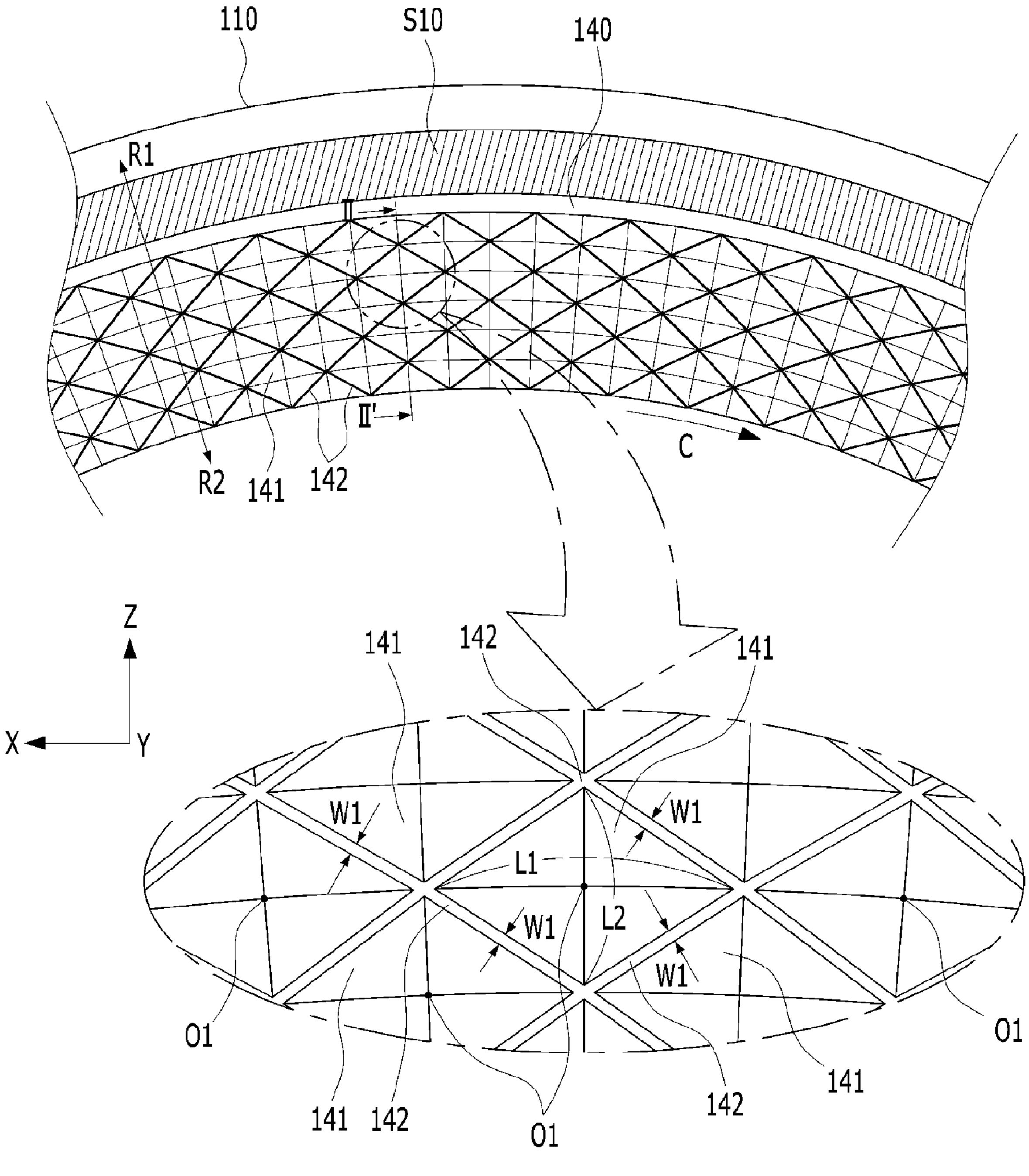
FIG. 3 is an enlarged side view showing a portion A1 of FIG. 2.
Figure 4:
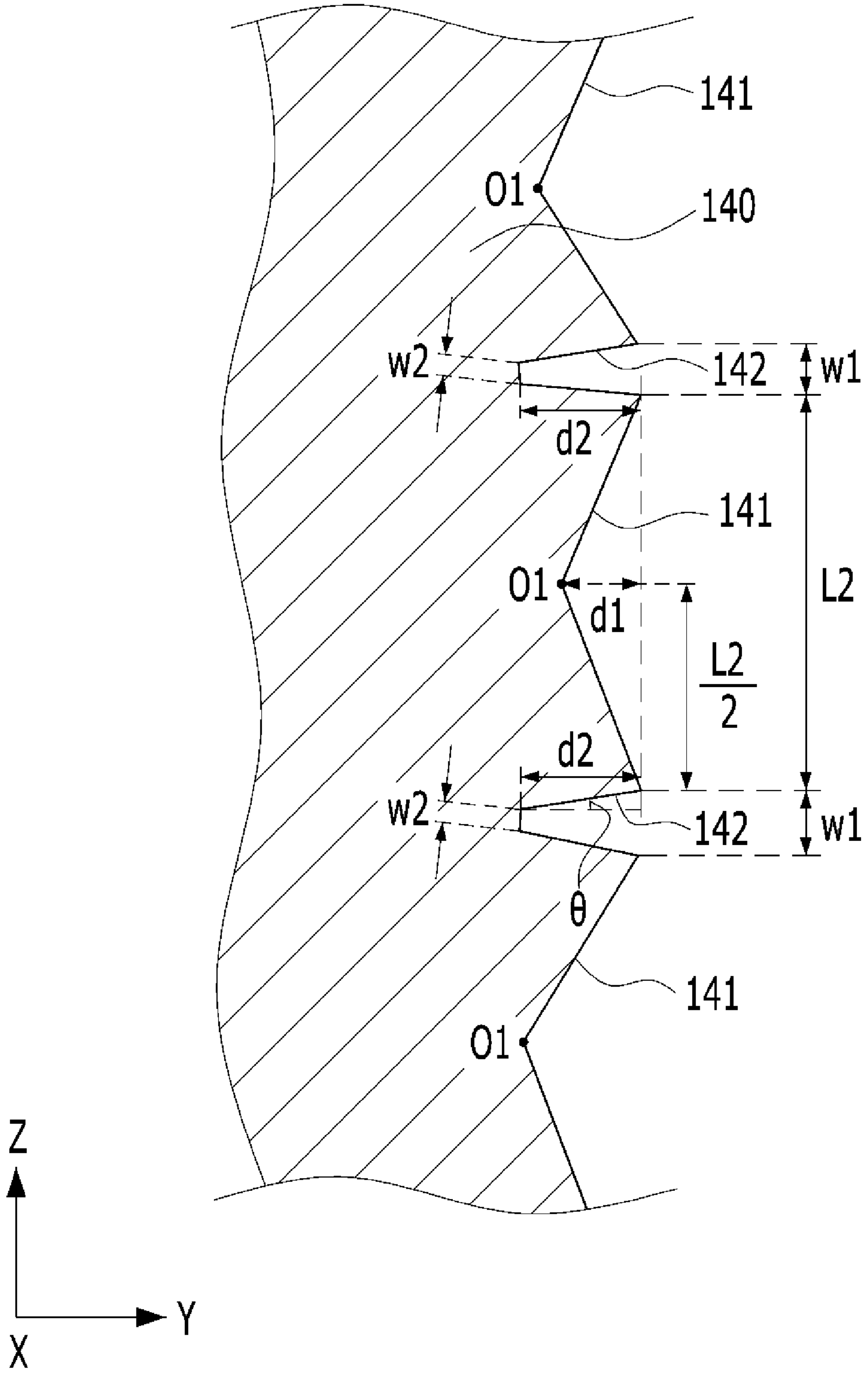
FIG. 4 is a sectional view taken along the line II-II' of FIG. 3.

FIG. 2 is a side view showing the tire according to the embodiment of the present invention, FIG. 3 is an enlarged side view showing a portion A1 of FIG. 2, and FIG. 4 is a sectional view taken along the line II-II' of FIG. 3.

Referring to FIGS. 1 to 4, the tire 100 according to the embodiment of the present invention includes concave portions 141 formed on each sidewall 140. Further, the tire 100 has grooves 142 formed on the sidewall 140.

Each concave portion 141 is formed inward from the outer surface of the sidewall 140. In this case, the outer surface of the sidewall 140 is the outer area of the sidewall 140 that is checkable with the naked eye on the outside of the tire 100 with respect to an axial direction (e.g., the direction of Y axis) of the tire 100. Hereinafter, an area where the concave portions 141 are formed on the entire outer surface of the sidewall 140 is called 'first formation area', for the conveniences of description.

The first formation area extends along the circumferential direction C of the tire 100 on the sidewall 140. In this case, the first formation area has the shape of an arc with a length shorter than the circumference of the tire 100. For example, the first formation area is formed to a length of ¼ of the circumference of the tire 100.

At least one or more first formation areas are formed. According to an embodiment of the present invention, one pair of first formation areas are formed on the sidewall 140. In this case, the first formation areas have the shape of arc with the same length as each other. The first formation areas are symmetrically spaced apart from each other on the sidewall 140.

According to an embodiment of the present invention, the first formation areas are formed on one pair of the sidewalls 140 connected to both sides of the tread 110, and according to another embodiment of the present invention, otherwise, the first formation areas are formed only on the sidewall 140 located on the outside of the vehicle, when the tire 100 is mounted onto the vehicle (not shown).

Each concave portion 141 has a depth increasing toward the center from the edges thereof. According to an embodiment of the present invention, the concave portion 141 is a square pyramid-shaped groove formed by connecting four tetrahedrons having the same shape and size. In this case, the section of the concave portion 141 that is viewed in the transverse direction (the direction of Y or −Y axis) has the shape of a rhombus. A center peak facing the base of the square pyramid among the peaks of the square pyramid-shaped concave portion 141 is located on the same line as the center 01 of the rhombus section of the concave portion 141.

In this case, the concave portion 141 has a depth increasing toward the center 01 from the edges of the rhombus section. Accordingly, the concave portion 141 has the maximum depth d1 at the center 01 of the section thereof. In this case, for example, the maximum depth d1 is in the range of 0.5 to 0.6 mm.

According to another embodiment of the present invention, the concave portion 141 has a depth constant toward the center from the edges thereof. In this case, the concave portion 141 is formed inward from the outer surface of the sidewall 140 to the shape of a circular cylinder or polygonal cylinder. For example, the concave portion 141 is a groove having the sectional shape of a rhombus and a constant depth. In this case, for example, the depth of the concave portion 141 is in the range of 0.5 to 0.6 mm.

Referring to the enlarged portion of FIG. 3, the concave portion 141 is configured to allow a width (hereinafter, referred to first width) L1 in the circumferential direction C of the tire 100 to be different from a width (hereinafter, referred to second width) L2 in the radial direction R of the tire 100.

According to an embodiment of the present invention, the concave portion 141 has the first width L1 longer than the second width L2. Accordingly, the section of the concave portion 141 that is viewed in the transverse direction (the direction of Y axis) has the shape of a rhombus having the width parallel to the circumferential direction C of the tire 100 longer than the width parallel to the radial direction R of the tire 100. For example, the second width L2 is 0.55 to 0.7 times shorter than the first width L1. Further, the second width L2 has a length of 3 to 20 mm, desirably 8 mm.

However, the present invention may not be limited to the above-mentioned embodiment, and accordingly, the concave portion 141 has the second width L2 longer than the first width L1 or has the first width L1 and the second width L2 having the same length.

The plurality of concave portions 141 are arranged along the circumferential direction C of the tire 100. In detail, each first formation area includes a plurality of columns of the concave portions 141 formed by arranging the plurality of concave portions 141 along the circumferential direction C of the tire 100. Further, the plurality of columns of the concave portions 141 formed on the first formation area are arranged again along the radial direction R of the tire 100.

According to an embodiment of the present invention, at least three columns of the concave portions 141 are formed on the first formation area. In this case, the first column of the concave portions 141 is located on the innermost side of the radial direction of the tire 100 along the circumferential direction C of the tire 100.

The second column of the concave portions 141 is located on the first formation area along the circumferential direction C of the tire 100, while being spaced apart from the first column of the concave portions 141 in the outer radial direction R1 of the tire 100, and the third column of the concave portions 141 is located on the first formation area along the circumferential direction C of the tire 100, while being spaced apart from the second column of the concave portions 141 in the outer radial direction R1 of the tire 100.

In this case, the concave portions 141 located on the first column are arranged misaligned with the concave portions 141 located on the second column. In detail, any one concave portion 141 located on the first column is located between the two neighboring concave portions 141 located on the second column.

The concave portions 141 located on the third column are arranged parallel to the concave portions 141 located on the first column. In detail, the center 01 of any one concave portion 141 located on the third column is located on the same line as the center 01 of any one concave portion 141 located on the first column along the radial direction R of the tire 100. Accordingly, the concave portions 141 located on the third column are arranged misaligned with the concave portions 141 located on the second column, in the same manner as the concave portions 141 located on the first column.

If a fourth column of the concave portions 141 is formed on the outer radial direction R1 of the third column of the concave portions 141, the concave portions 141 located on the fourth column are arranged parallel to the concave portions 141 located on the second column. Accordingly, the concave portions 141 located on the fourth column are arranged misaligned with the concave portions 141 located on the first column or the third column.

A larger number of columns of the concave portions 141 than the four columns of the concave portions 141 may be arranged. In this case, the plurality of columns of the concave portions 141 are arranged in the same method as the above-mentioned method or similar thereto, and therefore, an explanation of the arrangement will be avoided.

Like this, since the concave portions 141 having the same shape and size as or similar to one another are arranged on the outer surface of the sidewall 140 along the circumferential direction C of the tire 100, the air colliding against the outer surface of the tire 100 moves along the inner surfaces of the concave portions 141, while the vehicle onto which the tire 100 is mounted is being driven. As a result, a drag force of the air applied to the tire 100 becomes reduced, while the vehicle is being driven.

The grooves 142 are formed among the neighboring concave portions 141 to define the concave portions 141. In detail, as shown in the enlarged view of FIG. 3, the grooves 142 are formed among any one concave portion 141 and other concave portions 141 adjacent to one concave portion 141. The grooves 142 extend along the edges of one concave portion 141 in such a way as to completely surround the edges. As a result, the corresponding concave portion 141 is completely spaced apart from other concave portions 141 adjacent thereto.

The grooves 142 are formed inward from the outer surface of the sidewall 140. As shown in FIG. 4, each groove 142 has a depth d2 longer than the maximum depth d1 of the concave portion 141. That is, the depth d2 of the groove 142 is longer than the maximum depth d1 of the concave portion 141. However, the present invention may not be limited thereto, and the depth d2 of the groove 142 may be the same as the maximum depth d1 of the concave portion 141.

The groove 142 becomes reduced in width toward the inside thereof along the transverse direction (the direction of −Y axis) of the tire 100. According to an embodiment of the present invention, the groove 142 extends inclinedly to a given angle ø with respect to the transverse direction (the direction of −Y axis) of the tire 100 toward the inside thereof. In this case, for example, the given angle ø is in the range of 10 to 20°, desirably 15°. Accordingly, the outermost width (hereinafter, referred to as maximum width) W1 of the groove 142 is greater than the innermost width (hereinafter, referred to as minimum width) W2 thereof with respect to the transverse direction (the direction of Y axis) of the tire 100.

The maximum width W1 of the groove 142 is shorter than the first width L1 and the second width L2 of the concave portion 141. In detail, the maximum width W1 of the groove 142 is shorter than the second width L2 of the concave portion 141. The maximum width W1 of the groove 142 is less than or equal to 1/10 of the second width L2 of the concave portion 141. For example, if the second width L2 of the concave portion 141 is 8 mm and the given angle ø is 15°, the maximum width W1 of the groove 142 is about 0.46 mm and the minimum width W2 thereof is about 0.14 mm.

Further, the present invention may not be limited to the above-mentioned embodiment, and the groove 142 is constant in width toward the inside from the outer surface of the sidewall 140.

The tire 100 further includes a serration part S formed on the sidewall 140. The serration part S consists of a plurality of serrations having the shapes of elongated grooves extending inclinedly to a given angle in the inner radial direction R2 of the tire 100 from the tread 100. In this case, the elongated grooves are fine in width and equally spaced apart from one another.

According to an embodiment of the present invention, the serration part S is located between the tread 110 and the first formation area. Further, the serration part S is spaced apart from the first formation area in the outer radial direction R1 of the tire 100. In this case, the serration part S has the shape of an arc with the same shape and length as the first formation area or the shape of an arc with the shape and length similar to the first formation area.

According to another embodiment of the present invention, a given area (hereinafter, referred to first area) S10 of the serration part S is located between the tread 110 and the first formation area. Further, the other area (hereinafter, referred to second area) S20 of the serration part S is located on an area spaced apart from the first formation area on the outer surface of the sidewall 140 in the circumferential direction C of the tire 100. Like this, if one pair of first formation areas having the shape of the arc is provided, the second area S20 of the serration part S is located between the pair of first formation areas.

In more detail, the second area S20 of the serration part S is connected to the first area S10 in such a way at extend from one side of the first formation area in the circumferential direction C of the tire 100. In this case, the second area S20 of the serration part S is formed in the same width as or similar to the first area 10 to which the first formation area is added.

Even though not shown in the drawings, a display area is provided on the sidewall 140 of the tire 100. A tire manufacturing company name is displayed on the display area. Further, information, such as a type of tire, a product name, a serial number, a tire size, a tire manufacturing date, tire material information, tire maximum allowable internal pressure, maximum load capability information, various authentication marks, and the like is displayed on the display area.

The display area is located on the sidewall 140. According to an embodiment of the present invention, if one pair of first formation areas is provided on the sidewall 140, the display area is located between the pair of first formation areas on the outer surface of the sidewall 140 in the circumferential direction C of the tire 100.

According to another embodiment of the present invention, a plurality of display areas having different information are provided. In this case, the plurality of display areas are located on different positions from one another. Any one of the plurality of display areas is located between the pair of first formation areas on the outer surface of the sidewall 140.

Another display area is located on the second area S20 of the serration part S. In this case, the display area is surrounded by the plurality of serrations, and no serrations are formed on the corresponding display area. Further, another display area is located on the area of the outer surface of the sidewall 140 except the first formation area and the area on which the serration part S is located.

Figure 5:
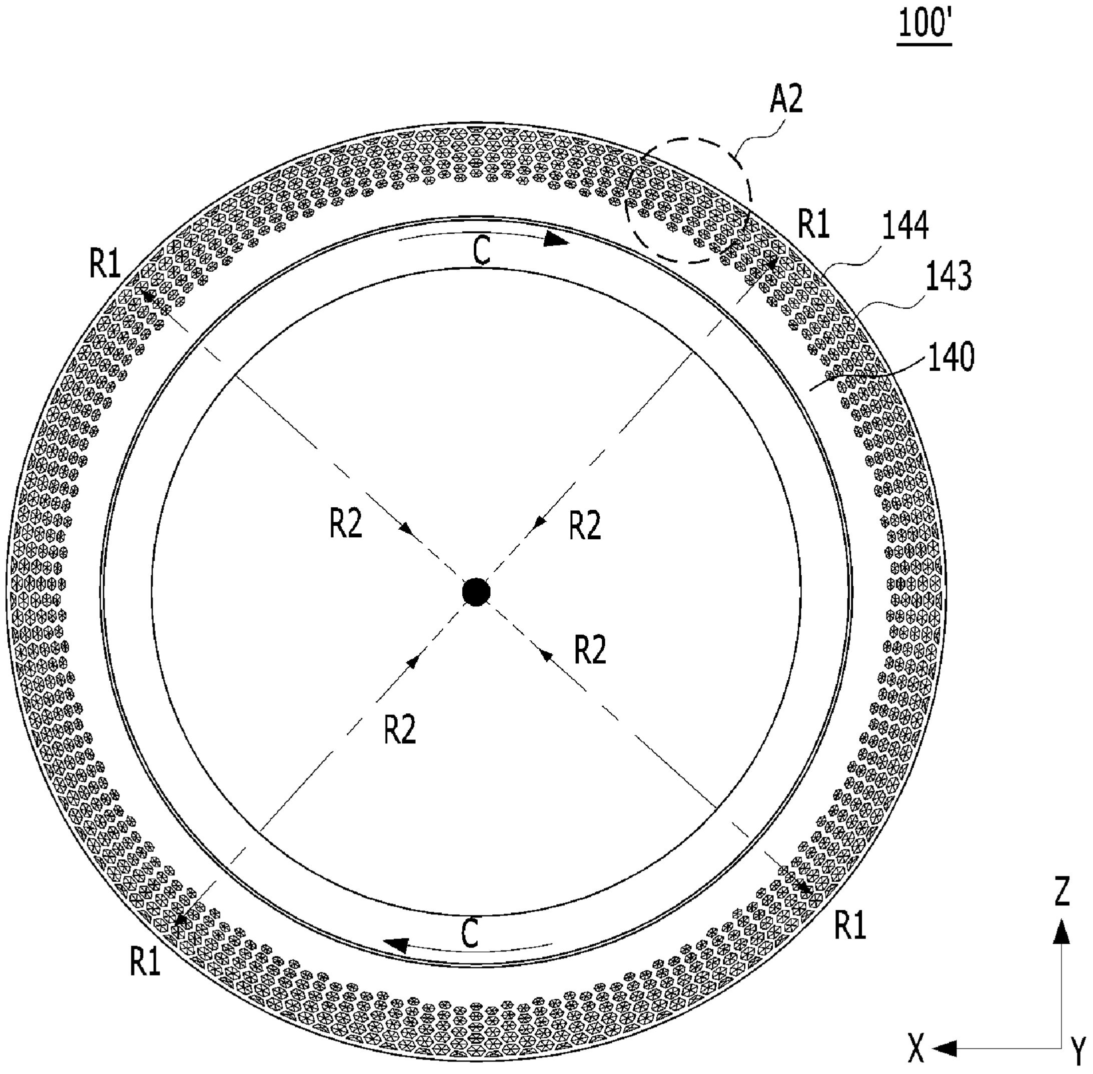
FIG. 5 is a sectional view showing a tire according to another embodiment of the present invention.
Figure 6:
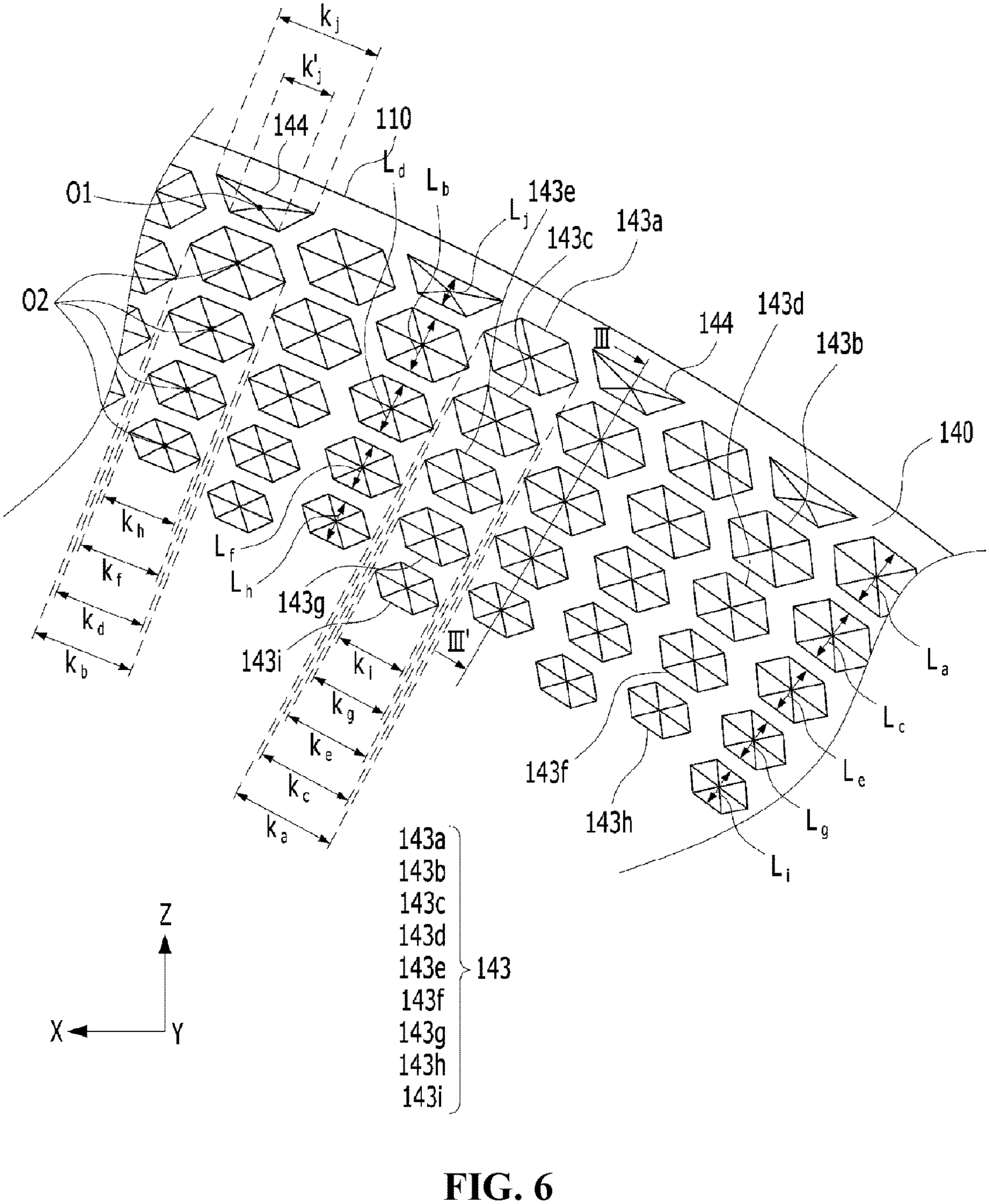
FIG. 6 is an enlarged side view showing a portion A2 of FIG. 5.

FIG. 5 is a sectional view showing a tire according to another embodiment of the present invention. FIG. 6 is an enlarged side view showing a portion A2 of FIG. 5, and FIG. 7 is a sectional view taken along the line III-III' of FIG. 6.

Figure 7:
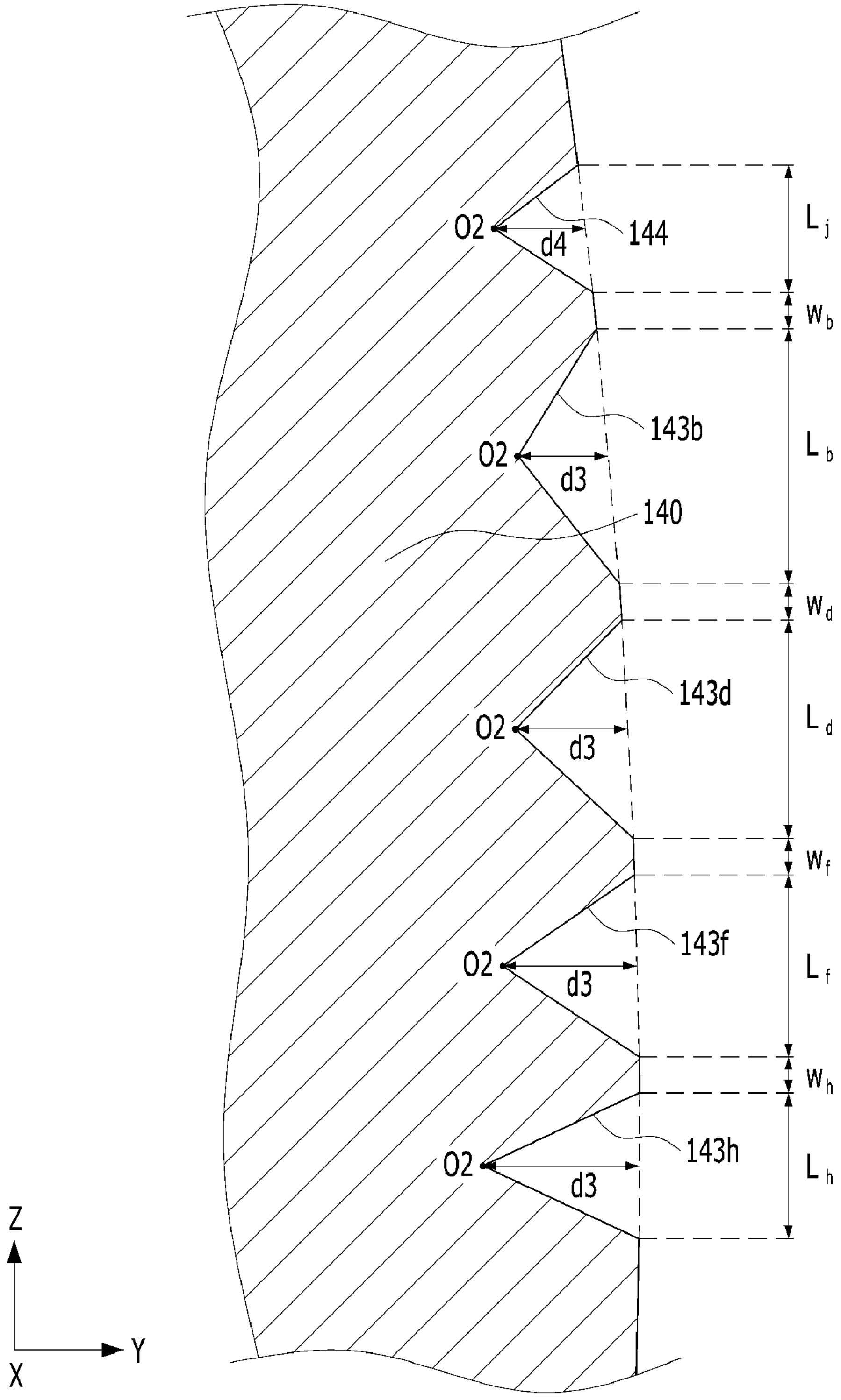
FIG. 7 is a sectional view taken along the line III-III' of FIG. 6.

Referring to FIGS. 5 to 7, a tire 100' according to another embodiment of the present invention includes first concave portions 143 and second concave portions 144 having different shapes from the first concave portions 143 on a sidewall 140. Hereinafter, an area where the first concave portions 143 and the second concave portions 144 are formed on the entire outer surface of the sidewall 140 is called 'second formation area', for the conveniences of description.

The second formation area extends along the circumferential direction C of the tire 100' on the sidewall 140. According to an embodiment of the present invention, the second formation area has the same length as the circumference length of the tire 100'. Accordingly, the second formation area has the shape of a ring, when viewed in the transverse direction (the direction of Y axis) of the tire 100'.

As mentioned above, a serration part is located between a tread 110 and the second formation area on the outer surface of the sidewall 140. Further, the serration part is spaced apart from the second formation area in the outer radial direction R1 of the tire 100'. In this case, the serration part has the shape of the same ring as the second formation area or the shape similar to the second formation area. However, the present invention may not be limited thereto, and the serration part may not be located on the sidewall 140.

According to another embodiment of the present invention, even though not shown in the drawings, the second formation area has the shape of an arc with a shorter length than the circumference length of the tire 100'. For example, the length of the second formation area is ¼ of the circumference length of the tire 100'. Accordingly, a pair of second formation areas is provided. In this case, the pair of second formation areas has the shape of an arc with the same length. The pair of second formation areas is symmetrically spaced apart from each other on the sidewall 140.

As mentioned above, the serration part is located on the outer surface of the sidewall 140. In this case, a given area (hereinafter, referred to first area) of the serration part is located between the tread 110 and the second formation area. Further, the other area (hereinafter, referred to second area) of the serration part is located on an area spaced apart from the second formation area on the outer surface of the sidewall 140 in the circumferential direction C of the tire 100'.

In more detail, the second area of the serration part is connected to the first area in such a way as to extend from one side of the second formation area in the circumferential direction C of the tire 100'. Like this, if one pair of second formation areas having the shape of the arc is provided, the second area of the serration part is located between the pair of second formation areas. The second area of the serration part is formed in the same width as or similar width to the first area to which the second formation area is added. However, the present invention may not be limited thereto, and no serration part is formed on the sidewall 140.

Even though not shown in the drawings, a display area is provided on the sidewall 140 of the tire 100'. In the same manner as above, information, such as a tire manufacturing company name, and the like, is displayed on the display area.

The display area is located on the sidewall 140. According to an embodiment of the present invention, the display area is located on the second formation area. In this case, the display area is surrounded by the plurality of first concave portions 143 and the plurality of second concave portions 144, and the first concave portions 143 and the second concave portions 144 are not formed on the display area.

According to another embodiment of the present invention, a plurality of display areas having different information are provided. In this case, the plurality of display areas are located on different positions from one another. For example, some of the plurality of display areas are spaced apart from one another on the second formation areas, and some of the plurality of display areas are located on an area where the second formation area is not formed on the outer surface of the sidewall 140.

Further, if one pair of second formation areas is provided on the sidewall 140, as mentioned above, the display area is located between the pair of second formation areas on the outer surface of the sidewall 140.

According to an embodiment of the present invention, further, the second formation area is formed on both of the sidewalls 140 connected to both sides of the tread 110, respectively, and according to another embodiment of the present invention, otherwise, the second formation area is formed only on the sidewall 140 located on the outside of the vehicle of the pair of sidewalls 140, when the tire 100' is mounted onto the vehicle.

Each first concave portion 143 has the shape of a groove formed inward from the outer surface of the sidewall 140. In this case, the first concave portion 143 has a depth increasing toward the center 02 from the edges thereof.

According to an embodiment of the present invention, the first concave portion 143 is a hexagonal pyramid-shaped groove formed by connecting six tetrahedrons having the same shape and size. In this case, the section of the first concave portion 143 that is viewed in the transverse direction C of the tire 100' has the shape of a hexagon. A center peak facing the base of the hexagonal pyramid among the peaks of the hexagonal pyramid-shaped concave portion 143 is located on the same line as the center 02 of the hexagonal section of the first concave portion 143.

In this case, the first concave portion 143 has a depth increasing toward the center 02 from the edges of the hexagonal section. Accordingly, the first concave portion 143 has the maximum depth d3 at the center 02 of the section thereof.

According to another embodiment of the present invention, the first concave portion 143 has a depth constant toward the center from the edges thereof. In this case, the first concave portion 143 is formed inward from the outer surface of the sidewall 140 to the shape of a circular cylinder or polygonal cylinder. For example, the first concave portion 143 is a groove having the sectional shape of a hexagon with a constant depth.

As shown in FIG. 6, the maximum length (hereinafter, referred to as first length) K of the first concave portion 143 in the circumferential direction C of the tire 100' is different from than the maximum length (hereinafter, referred to as second length) L of the first concave portion 143 in the radial direction R of the tire 100'.

According to an embodiment of the present invention, the first length K of the first concave portion 143 is longer than the second length L thereof. When viewed in the transverse direction (the direction of Y axis) of the tire 100', the section of the first concave portion 153 has the shape of a hexagon having the length parallel to the circumferential direction C of the tire 100' longer than the length parallel to the radial direction R of the tire 100'. However, the present invention may not be limited to the above-mentioned embodiment, and the second length L of the first concave portion 143 is longer than the first length K thereof. Otherwise, the first length K is the same as the second length L.

The plurality of first concave portions 143 are arranged in the radial direction R of the tire 100'. In this case, the arrangements of the plurality of first concave portions 143 will be explained later together with the arrangements of the plurality of second concave portions 144.

Each second concave portion 144 has the shape of a groove formed inward from the outer surface of the sidewall 140. In this case, the second concave portions 144 are located on the outsides of the first concave portions 143 on the second formation area in the radial direction of the tire 100'.

The second concave portion 144 has a depth increasing toward the center 03 from the edges thereof. According to an embodiment of the present invention, the second concave portion 144 is a pyramid-shaped groove formed by connecting four different tetrahedrons. In this case, the section of the second concave portion 144 that is viewed in the transverse direction C (the direction of Y axis) of the tire 100' has the shape of a trapezoid. A center peak facing the base of the trapezoidal pyramid among the peaks of the trapezoidal pyramid-shaped second concave portion 144 is located on the same line as the center 03 of the trapezoidal section of the second concave portion 144.

In this case, the second concave portion 144 has a depth increasing toward the center 03 from the edges of the trapezoidal section. Accordingly, the second concave portion 144 has the maximum depth d4 at the center 03 of the section thereof. In this case, the maximum depth d4 of the second concave portion 144 is the same as or similar to the maximum depth d3 of the first concave portion 143.

When viewed in the transverse direction C (the direction of Y axis) of the tire 100', the section of the second concave portion 144 has the shape of the trapezoid having the width in the circumferential direction C of the tire 100' longer than the width in the radial direction R of the tire 100'.

Accordingly, as shown in FIG. 6, one edge (hereinafter, referred to as outside edge) Kj of the two edges parallel to each other, which is longer than the other on the trapezoidal section of the second concave portion 144, is located on the radial outside of the tire 100', and the other (hereinafter, referred to as inside edge) Kj', which is shorter than one edge, is located on the radial inside of the tire 100'.

In this case, the plurality of first concave portions 143 and the plurality of second concave portions 144 are arranged on the sidewall 140 or the second formation area by the following arrangements.

The plurality of first concave portions 143 are arranged in the radial direction R of the tire 100'. In detail, a row of first concave portions 143 where the plurality of first concave portions 143 are arranged in the radial direction R of the tire 100' is located on the second formation area.

In this case, a plurality of rows of first concave portions 143 are located on the second formation area, and the plurality of rows of first concave portions 143 are arranged in the circumferential direction C of the tire 100'. The second concave portions 144 are located on some of the plurality of rows of first concave portions 143.

According to an embodiment of the present invention, the second concave portions 144 are located alternately on the plurality of rows of first concave portions 143 arranged in the circumferential direction C of the tire 100'.

In detail, the second concave portion 144 is located on any one row of the plurality of rows of first concave portions 143, and the second concave portion 144 is not located on the next row of first concave portions 143 arranged in the circumferential direction C of the tire 100'. Further, the second concave portion 144 is located on the next row to the row where the second concave portion 144 is not located. Under such arrangements, the first concave portions 143 and the second concave portions 144 are located on the second formation area.

Hereinafter, the rows where the second concave portion 144 is located among the plurality of rows of first concave portions 143 are called 'first rows', and the rows where the second concave portions 144 are not located (that is, only the first concave portions 143 are located) among the plurality of rows of first concave portions 143 are called 'second rows', for the conveniences of the description.

For example, each first row includes four first concave portions **143*b*, 143*d*, 143*f*, and 143*h* and one second concave portion 144, and each second row includes five first concave portions 143*a*, 143*c*, 143*e*, 143*g*, and 143*i*, but the number of first concave portions 143 or second concave portions 144** may not be limited thereto.

The first rows and the second rows are arranged on the sidewall 140 in the circumferential direction C of the tire 100'. In this case, each first row and each second row are alternately arranged. According to an embodiment of the present invention, in this case, the first row is spaced apart from the second row in the circumferential direction C of the tire 100', but the present invention may not be limited thereto.

The concave portions **143*b*, 143*d*, 143*f*, 143*h*, and 144 located on the first row are arranged misaligned with the first concave portions 143*a*, 143*c*, 143*e*, 143*g*, and 143*i* located on the second row. In detail, any one of the first concave portions located on the second row is located between the two neighboring first concave portions located on the first row or between the first concave portion and the second concave portion 144** adjacent to each other.

In the case of each first row, the second concave portion 144 is located on the outermost side of the first row with respect to the radial direction R of the tire 100', and next, the four first concave portions **143*b*, 143*d*, 143*f*, and 143*h* are arranged sequentially in the inner radial direction R2 of the tire 100'**.

The first concave portions **143*b*, 143*d*, 143*f*, and 143*h* located on the first row have different sizes from one another. According to an embodiment of the present invention, the first concave portions 143*b*, 143*d*, 143*f*, and 143*h* located on the first row become reduced in size toward the inner radial direction R2 of the tire 100'**.

In detail, among the first concave portions **143*b*, 143*d*, 143*f*, and 143*h*, the first concave portion 143*b* located on the outermost side of the first row in the radial direction of the tire 100' has the longest first length Kb and the longest second length Lb. First lengths Kd, Kf, and Kh and second lengths Ld, Lf, and Lh of the first concave portions 143*d***,

143*f*, and 143*h* located sequentially in the inner radial direction R2 of the tire 100' become gradually reduced. Accordingly, the first concave portion 143*h* located on the innermost side of the first row in the radial direction of the tire 100' has the shortest first length Kh and the shortest second length Lh.

On the first row, the first lengths K and the second lengths L of the first concave portions 143*b*, 143*d*, 143*f*, and 143*h* are constantly reduced. In detail, the first concave portions 143*b*, 143*d*, 143*f*, and 143*h* are gradually reduced with constant length differences toward the inner radial direction R2 of the tire 100'. In this case, the reduction values (or reduction ratios) of the first lengths K are different from the reduction values of the second lengths L.

The second concave portion 144 is located on the outside of the first concave portion 143*b* located on the outermost side among the first concave portions 143*b*, 143*d*, 143*f*, and 143*h* in the outer radial direction R1 of the tire 100'. In this case, the outside edge Kj of the second concave portion 144 has a longer length than the second lengths Lb, Ld, Lf, and Lh of the first concave portions 143*b*, 143*d*, 143*f*, and 143*h*. Further, the second length Lj of the second concave portion 144 is shorter than the first lengths Kb, Kd, Kf, and Kh of the first concave portions 143*b*, 143*d*, 143*f*, and 143*h*.

For example, the first concave portion 143*b* located on the outermost side among the first concave portions 143*b*, 143*d*, 143*f*, and 143*h* of the first row in the radial direction of the tire 100' has the first length Kb of 6.8 mm. The second lengths Kd, Kf, and Kh of the first concave portions 143*d*, 143*f*, and 143*h* arranged sequentially are constantly reduced by 0.6 mm, so that they are reduced to 6.1 mm, 5.5 mm, and 4.9 mm. In this case, the outside edge Kj of the second concave portion 144 has a longer length than 6.8 mm, and the second length Lj of the second concave portion 144 is shorter than 4.9 mm.

Intervals among the second concave portion 144 and the first concave portions 143*b*, 143*d*, 143*f*, and 143*h* are different from one another. According to an embodiment of the present invention, the intervals among the second concave portion 144 and the first concave portions 143*b*, 143*d*, 143*f*, and 143*h* are constantly reduced.

In detail, the interval (hereinafter, referred to as first interval) Wb between the second concave portion 144 and the first concave portion 143*b* has the maximum length, and next, the interval (hereinafter, referred to as third interval) Wd between the first concave portion 143*b* and the first concave portion 143*d*, the interval (hereinafter, referred to as fifth interval) Wf between the first concave portion 143*d* and the first concave portion 143*f*, and the interval (hereinafter, referred to as seventh interval) Wh between the first concave portion 143*f* and the first concave portion 143*h* become reduced constantly.

For example, the first interval Wb is 3 mm, the third interval Wd is 2.8 mm, the fifth interval Wf is 2.6 mm, and the seventh interval Wh is 2.4 mm, so that the intervals are constantly reduced by 0.2 mm. However, the present invention may not be limited thereto, and the intervals Wb, Wd, Wf, and Wh) among the first concave portions 143*b*, 143*d*, 143*f*, and 143*h* are the same as one another.

In the case of each second row, the first concave portion 143*a* is located on the outermost side of the second row with respect to the radial direction R of the tire 100', and next, the four first concave portions 143*c*, 143*e*, 143*g*, and 143*i* are arranged sequentially in the inner radial direction R2 of the tire 100'.

The first concave portions 143*a*, 143*c*, 143*e*, 143*g*, and 143*i* located on the second row have different sizes from one another. According to an embodiment of the present invention, the first concave portions 143*a*, 143*c*, 143*e*, 143*g*, and 143*i* located on the second row become reduced in size toward the inner radial direction R2 of the tire 100'.

In detail, among the first concave portions 143*a*, 143*c*, 143*e*, 143*g*, and 143*i*, the first concave portion 143*a* located on the outermost side of the second row in the radial direction of the tire 100' has the longest first length Ka and the longest second length La. First lengths Kd, Kf, Kh, and Ki and second lengths Ld, Lf, Lh, and Li of the first concave portions 143*c*, 143*e*, 143*g*, and 143*i* located sequentially in the inner radial direction R2 of the tire 100' become gradually reduced. Accordingly, the first concave portion 143*i* located on the innermost side of the second row in the radial direction of the tire 100' has the shortest first length Ki and the shortest second length Li.

On the second row, the first lengths K and the second lengths L of the first concave portions 143*a*, 143*c*, 143*e*, 143*g*, and 143*i* are constantly reduced toward the inner radial direction R2 of the tire 100', and the intervals among the first concave portions 143*a*, 143*c*, 143*e*, 143*g*, and 143*i* are constantly reduced, which are the same as or similar to those of the first row. Therefore, an explanation of them will be avoided.

Referring to the relation between the first row and the second row, the lengths K of the concave portions 143 and 144 in the circumferential direction C of the tire 100' are gradually reduced toward the inner radial direction in a zigzag order between the first row and the second row.

In detail, the outside edge Kj of the second concave portion 144 of the first row has the longest length, and next, the first length Ka of the first concave portion 143*a* of the second row, the first length Kb of the first concave portion 143*b* of the first row, the first length Kc of the first concave portion 143*c* of the second row, and the first length Ki of the first concave portion 143*i* of the innermost side of the second row are gradually reduced sequentially.

Further, the lengths L of the concave portions 143 and 144 located on the first row and the second row in the radial direction R of the tire 100' are gradually reduced toward the inner radial direction in a zigzag order between the first row and the second row.

In detail, the second length La of the first concave portion 143*a* of the outermost side of the second row has the longest length, and next, the second length Lb of the first concave portion 143*b* of the first row, the second length Lb of the first concave portion 143*c* of the second row, the second length Ld of the first concave portion 143*d* of the first row, and the second length Li of the first concave portion 143*i* of the innermost side of the second row are gradually reduced sequentially.

Like this, the plurality of first concave portions 143 are arranged in a patten where their size becomes gradually reduced in the radial direction R of the tire 100', and while the vehicle is being driven, accordingly, the air colliding against the outer surface of the tire 100' moves along the inner surfaces of the first concave portions 143 arranged in such a pattern, thereby allowing the aerodynamic force and drag applied to the tire 100' to be reduced. In addition, the plurality of first and second concave portions 143 and 144 are arranged in a pattern having given tendency, thereby allowing the outer appearance of the tire 100' to be upgraded.

Further, the second concave portions 144, which have different shapes and sizes from the first concave portions 143, are located between the first concave portions 143 on the outside of the outer surface of the sidewall 140 in the radial direction of the tire 100' where the contact area with air is relatively large, while the vehicle is being driven, thereby improving the reduction of the aerodynamic force and drag of the tire 100'.

As described above, the tire 100 according to the embodiment of the present invention is configured to allow the concave portions 141 each having the shape of the groove whose section is rhombus-shaped to be formed in a given pattern on the outer surface of the sidewall 140, thereby easily emitting the heat generated while the vehicle is being driven and reducing the drag applied between the tire 100 and the air due to the vehicle driven. Further, the tire 100' according to another embodiment of the present invention is configured to allow the first concave portions 143 and the second concave portions 144 having different shapes and sizes from one another to be formed on the outer surface of the sidewall 140 to apply given tendency to their arranged pattern, thereby improving tire heat emission and drag reduction effectiveness while the vehicle is being driven.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the parts expressed in a singular form may be dispersedly provided, and in the same manner as above, the parts dispersed may be combined with each other.

Therefore, the present invention is not to be restricted by the embodiments as mentioned above. It is therefore intended that the scope of the invention be limited not by this detailed description, but rather by the claims appended hereto.

INDUSTRIAL APPLICABILITY

The present invention relates to the tire having the dimples (concave portions) that is applicable industrially.

The invention claimed is:

1. A tire comprising:
sidewalls extending from both sides of a tread, at least one of the sidewalls having a plurality of concave portions arranged in a circumferential direction of the tire,
wherein each of the plurality of concave portions is defined inward from an outer surface of the at least one of the sidewalls,
wherein a depth of each of the plurality of concave portions increases toward a center thereof from perimeter edges thereof,
wherein the at least one of the sidewalls has grooves defined among adjacent concave portions of the plurality of concave portions, and each of the grooves is defined inward from the outer surface of the at least one of the sidewalls,
wherein the grooves extend along the perimeter edges of each of the plurality of concave portions to completely surround and space apart each individual concave portion of the plurality of concave portions,
wherein each of the plurality of concave portions has a pyramid shape defined by four triangular planar side surfaces converging toward a bottom point of each concave portion, the bottom point being the center of each of the plurality of concave portions, the four triangular planar side surfaces meeting directly with side surfaces of the grooves to define the perimeter edges of each of the plurality of concave portions,
wherein a depth of each of the grooves and the depth of each of the plurality of concave portions extend from a level corresponding to the perimeter edges, and
wherein the depth of each of the grooves is greater than the depth of each of the plurality of concave portions.

2. The tire according to claim 1,
wherein each of the grooves becomes reduced in width from the outer surface of the at least one of the sidewalls toward an inside of each of the grooves.

3. The tire according to claim 1,
wherein each of the grooves extends in a constant width from the outer surface of the at least one of the sidewalls toward an inside of each of the grooves.

4. The tire according to claim 1,
wherein the plurality of concave portions are arranged in a plurality of columns spaced apart from one another in a radial direction of the tire, and the plurality of concave portions arranged in any one of the plurality of columns are arranged misaligned with the plurality of concave portions arranged in another column of the plurality of columns.

5. The tire according to claim 1,
wherein each of the plurality of concave portions has a width in the circumferential direction of the tire longer than a width in a radial direction of the tire.

6. The tire according to claim 1,
wherein the outer surface of the at least one of the sidewalls comprises a serration part arranged on at least one of a first area and a second area, the first area being arranged between the tread and a first formation area where the plurality of concave portions are arranged, the second area being spaced apart from the first formation area in the circumferential direction of the tire.

7. The tire according to claim 1,
wherein the at least one of the sidewalls comprises a display area arranged on the outer surface thereof, the display area being spaced apart from the plurality of concave portions.

8. A tire comprising:
sidewalls extending from both sides of a tread, at least one of the sidewalls having:
a plurality of first concave portions arranged in a radial direction of the tire, each of the plurality of first concave portions being defined inward from an outer surface of the at least one of the sidewalls, wherein a depth of each of the plurality of first concave portions increases toward a center thereof from perimeter edges thereof, and
a plurality of second concave portions arranged on outsides of the plurality of first concave portions in the radial direction of the tire, each of the plurality of second concave portions being defined inward from the outer surface of the at least one of the sidewalls,
wherein the at least one of the sidewalls has grooves defined among adjacent first concave portions of the plurality of first concave portions and adjacent second concave portions of the plurality of second concave portions, and each of the grooves is defined inward from the outer surface of the at least one of the sidewalls,
wherein the grooves extend along the perimeter edges of each of the plurality of first concave portions to completely surround and space apart each individual concave portion of the plurality of first concave portions,
wherein each of the plurality of first concave portions has a pyramid shape defined by six triangular planar side surfaces converging toward a bottom point of each concave portion, the bottom point being the center of each of the plurality of first concave portions, the six triangular planar side surfaces meeting directly with side surfaces of the grooves to define the perimeter edges of each of the plurality of first concave portions, wherein a depth of each of the grooves and the depth of each of the plurality of first concave portions extend from a level corresponding to the perimeter edges, and wherein the depth of each of the grooves is greater than the depth of each of the plurality of first concave portions.

9. The tire according to claim 8, wherein the plurality of first concave portions are arranged in a plurality of rows spaced apart from one another in a circumferential direction of the tire, and the plurality of second concave portions are arranged on some of the plurality of rows in the radial direction of the tire.

10. The tire according to claim 9, wherein the plurality of first concave portions arranged in any one row of the plurality of rows have different sizes from one another.

11. The tire according to claim 9, wherein the plurality of first concave portions become gradually reduced in size toward an inner radial direction of the tire from an outer radial direction of the tire.

12. The tire according to claim 8, wherein each of the plurality of first concave portions and each of the plurality of second concave portions have widths in a circumferential direction of the tire longer than widths in the radial direction of the tire.

13. The tire according to claim 8, wherein a width of each of the plurality of second concave portions in a circumferential direction of the tire becomes reduced toward an inner radial direction of the tire from an outer radial direction of the tire.

14. The tire according to claim 8, wherein the outer surface of the at least one of the sidewalls comprises a serration part arranged on at least one of a first area and a second area, the first area being arranged between the tread and a second formation area where the plurality of first concave portions and the plurality of second concave portions are arranged, the second area being spaced apart from the second formation area in a circumferential direction of the tire.

15. The tire according to claim 8, wherein the at least one of the sidewalls comprises a display area arranged on the outer surface thereof, wherein the display area is surrounded by the plurality of first concave portions and the plurality of second concave portions.

16. A tire, comprising:

sidewalls extending from both sides of a tread, at least one of the sidewalls having a plurality of concave portions arranged in a circumferential direction of the tire, wherein each of the plurality of concave portions is defined inward from an outer surface of the at least one of the sidewalls, wherein a depth of each of the plurality of concave portions increases toward a center thereof from perimeter edges thereof, wherein the at least one of the sidewalls has grooves defined among adjacent concave portions of the plurality of concave portions, and each of the grooves is defined inward from the outer surface of the at least one of the sidewalls, wherein the grooves extend along the perimeter edges of each of the plurality of concave portions to completely surround and space apart each individual concave portion of the plurality of concave portions, wherein side surfaces of each of the plurality of concave portions meet directly with side surfaces of the grooves to define the perimeter edges of each of the plurality of concave portions, wherein a depth of each of the grooves and the depth of each of the plurality of concave portions extend from a level corresponding to the perimeter edges, and wherein the depth of each of the grooves is greater than the depth of each of the plurality of concave portions.

* * * * *